United States Patent
Hicks et al.

(10) Patent No.: US 11,093,371 B1
(45) Date of Patent: Aug. 17, 2021

(54) HIDDEN INPUT DETECTION AND RE-CREATION OF SYSTEM ENVIRONMENT

(71) Applicant: International Business Machines Corporation, Armonk, NY (US)

(72) Inventors: Andrew C. M. Hicks, Wappingers Falls, NY (US); Michael Terrence Cohoon, Fishkill, NY (US); Ryan Thomas Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/838,094

(22) Filed: Apr. 2, 2020

(51) Int. Cl.
*G06F 9/44* (2018.01)
*G06F 11/36* (2006.01)

(52) U.S. Cl.
CPC ...... *G06F 11/3664* (2013.01); *G06F 11/3612* (2013.01); *G06F 11/3636* (2013.01); *G06F 11/3684* (2013.01); *G06F 11/3688* (2013.01)

(58) Field of Classification Search
CPC ............. G06F 11/3664; G06F 11/3612; G06F 11/3636; G06F 11/3684; G06F 11/3688
See application file for complete search history.

(56) References Cited

U.S. PATENT DOCUMENTS

| | | |
|---|---|---|
| 9,075,912 B2 | 7/2015 | Rhee et al. |
| 9,983,978 B1 | 5/2018 | Mola et al. |
| 2006/0129893 A1* | 6/2006 | Smith ................ G06F 11/3476 714/38.14 |
| 2011/0264787 A1* | 10/2011 | Mickens ............. G06F 11/3476 709/224 |
| 2019/0121979 A1 | 4/2019 | Chari et al. |
| 2020/0257614 A1* | 8/2020 | Davis ................. G06F 11/3612 |

FOREIGN PATENT DOCUMENTS

| | | |
|---|---|---|
| CN | 109902564 A | 6/2019 |
| JP | 6375200 B2 | 8/2018 |
| WO | 2016063816 A1 | 4/2016 |

OTHER PUBLICATIONS

Anonymous, "Reinforcement Learning for Fuzzing Testing Techniques," An IP.com Prior Art Database Technical Disclosure, IPCOM000252021D, Dec. 13, 2017, 36 pages.

Sakurada et al., "Anomaly Detection Using Autoencoders with Nonlinear Dimensionality Reduction," In Proceedings of the MLSDA 2014 2nd Workshop on Machine Learning for Sensory Data Analysis, Association for Computing Machinery, 2014, 8 pages.

Sultana et al., "An Improved Hidden Markov Model for Anomaly Detection Using Frequent Common Patterns," 2012 IEEE International Conference on Communications (ICC), 2012, pp. 1113-1117.

* cited by examiner

*Primary Examiner* — Hang Pan
(74) *Attorney, Agent, or Firm* — Cantor Colburn LLP; Teddi Maranzano

(57) ABSTRACT

Aspects of the invention include receiving system data associated with a software application running on a first system, the system data comprising system environment data captured during execution of the software application on the first system, determining one or more hidden inputs of an environment of the first system during execution of the software application, the determining based at least in part on the system environment data, and re-creating the environment of the first system during execution of the software application on a second system, the re-creating based at least in part on the one or more hidden inputs.

14 Claims, 6 Drawing Sheets

300

Receiving system data associated with a software application running on a first system, the system data comprising system environment data captured during execution of the software application on the first system
302

Determining one or more hidden inputs of an environment of the first system during execution of the software application based at least in part on the system environment data
304

Recreating the environment of the first system during execution of the software application on a second system
306

FIG. 3

HIDDEN INPUT DETECTION AND RE-CREATION OF SYSTEM ENVIRONMENT

BACKGROUND

The present invention generally relates to testing software, and more specifically, to hidden input detection and re-creation of a system environment.

Software testing is a set of processes aimed at investigating, evaluating, and ascertaining the completeness and quality of computer software. With the complexity of large scale computer systems that operate complex software applications, software testing cannot cover every potential fault, or bug, that can occur in an application when it is executed in a customer environment. Typically, when bugs are uncovered by a customer, the customer will notify the software provider to resolve the software bugs. However, due to the complexity and differences between customer system environments, resolving the software bug may require the re-creation of the customer system environment on a testing system to further analyze and resolve the software bug.

SUMMARY

Embodiments of the present invention are directed to a method for hidden input detection and re-creation of system environment. A non-limiting example computer-implemented method includes receiving system data associated with a software application running on a first system, the system data comprising system environment data captured during execution of the software application on the first system, determining one or more hidden inputs of an environment of the first system during execution of the software application, the determining based at least in part on the system environment data, and re-creating the environment of the first system during execution of the software application on a second system, the re-creating based at least in part on the one or more hidden inputs.

Embodiments of the present invention are directed to a system for hidden input detection and re-creation of system environment. A non-limiting example system includes a process configured to perform receiving system data associated with a software application running on a first system, the system data comprising system environment data captured during execution of the software application on the first system, determining one or more hidden inputs of an environment of the first system during execution of the software application, the determining based at least in part on the system environment data, and re-creating the environment of the first system during execution of the software application on a second system, the re-creating based at least in part on the one or more hidden inputs.

Embodiments of the present invention are directed to a computer program product for hidden input detection and re-creation of system environment, the computer program product including a computer readable storage medium having program instructions embodied therewith. The program instructions are executable by a processor to cause the processor to perform a method. A non-limiting example of the method includes receiving system data associated with a software application running on a first system, the system data comprising system environment data captured during execution of the software application on the first system, determining one or more hidden inputs of an environment of the first system during execution of the software application, the determining based at least in part on the system environment data, and re-creating the environment of the first system during execution of the software application on a second system, the re-creating based at least in part on the one or more hidden inputs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a flow diagram of a method for hidden input detection and re-creation of system environments according to one or more embodiments of the present invention;

Figure 1:
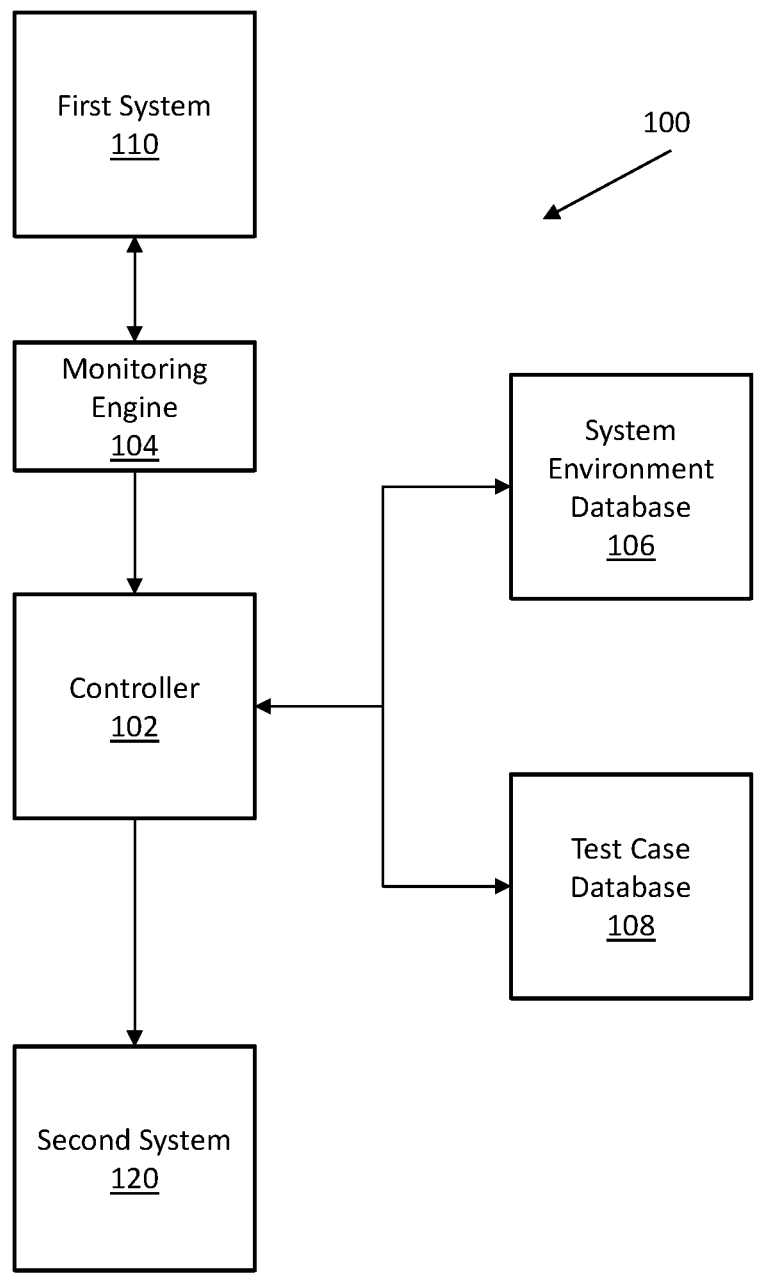
FIG. 1 depicts a block diagram of a system for hidden input detection and re-creation of system environment in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for hidden input anomaly detection for re-creation of a system environment for further testing. Software testing is a complex field that requires a multitude of techniques to ensure proper test coverage of a software application. These techniques are typically helpful for identifying obvious bugs, or faults. However, despite testing developers' best efforts, a test case or test suite (i.e., a collection of test cases) might not be able to identify bugs, or faults, in the software application that are caused by system environment issues. Thus, when a customer utilizes the software application, they may discover faults that are caused by so called "hidden inputs" in the customer system environment that were not contemplated during the testing phase of the software application. This is because customer system environments can differ widely based on the customer requirements and usages. Complex customer system environments can run many different types of processes including single-threaded jobs, multi-threaded applications, test cases, thrashers, and the like. These different processes may perform numerous different tasks and can consume different system resources. In an ideal scenario, running the same process in different system environments would yield the same or similar results; however, many system environments differ greatly which can cause the same process to yield different results depending on where it is executed. While the inputs to the individual processes are known, there exist these hidden inputs for the system environments that can affect the results of the processes. Examples of these "hidden inputs" include, but are not limited to, memory usage, central processing unit (CPU) consumption, million instructions per second (MIPS), contention, input/output (I/O) activity, active address spaces, peripheral component interconnect express (PCI-E) activity, physical hardware, attached devices, storage types, and the like.

Aspects of the present invention provide for the capturing of these "hidden inputs" during the execution of a process which allows these hidden inputs to be utilized to re-create the state of the customer system in a testing environment to address the fault. In accordance with one or more embodiments of the present invention, to enhance testing coverage for a system, a test engineer first re-creates the customer's system state in order to re-create the error (or unexpected result) and fix the error within the customer's environment. Also, the re-creation of the customer system environment allows for development of new test cases or utilization of existing test cases to essentially mimic the state (or environment) of the customer system at the time the fault was detected. This re-creation of the customer system environment allows for further testing of the software application.

Turning now to FIG. 1, a system for hidden input detection and re-creation of system environment is generally shown in accordance with one or more embodiments of the present invention. The system 100 includes a controller 102 in communication with a monitoring engine 104 that monitors system environment data on a first system 110. In one or more embodiments of the present invention, the first system 110 can be any type of computer system including, but not limited to, a mainframe computing system. The system environment data collected by the monitoring engine 104 can include parameters or characteristics of the system environment on the first system 110 while a process or software application is running on the first system 110. These parameters or characteristics are referred to herein as hidden inputs and they are collected during execution of different processes or software applications on the first system 110. The monitoring engine 104 captures these hidden inputs as processes execute on the first system 110. Additional metrics for these hidden inputs can also be recorded and stored in the system environment database 106. By capturing the state of the first system 110 before, during, and after process execution, the hidden inputs (e.g., resource consumption) for each process can be identified. When a fault or error occurs on the first system 110, the monitoring engine 104 can send the system environment data to the controller 102 which can be stored in the system environment database 106.

In one or more embodiments of the present invention, the controller 102 analyzes the system environment data from the first system 110 to re-create the first system environment on the second system 120. The re-creation of the first system environment is done to further test the software applications and any updates to the software applications on the second system 120. The first system 110 can be a customer system operating for a customer. When a customer reports a fault, error, or bug in a software, the second system 120, which may be a testing computing system, has the first system environment re-created on it so as to further test one or more software applications in the customer environment. This re-creation process can be performed by segmenting the first system environment into multiple time segments. The multiple time segments can be segmented based on process boundaries which can be the start time and stop time of a specified process executing on the first system 110. The controller 102 can analyze the first system environment and compare the first system environment to a second system environment on the second system 120. The delta between the hidden input values on the first and second system environments can be taken to determine one or more test cases from the test case database 108 that can be executed to drive the second system to have the same or similar hidden input values to re-create the first system environment on the second system 120. As mentioned above, the hidden input values can include values for memory usage, CPU consumption, MIPS, contention, I/O activity, active address spaces, PCI-E activity, physical hardware activity, attached device activity, storage types, and the like.

Figure 2:
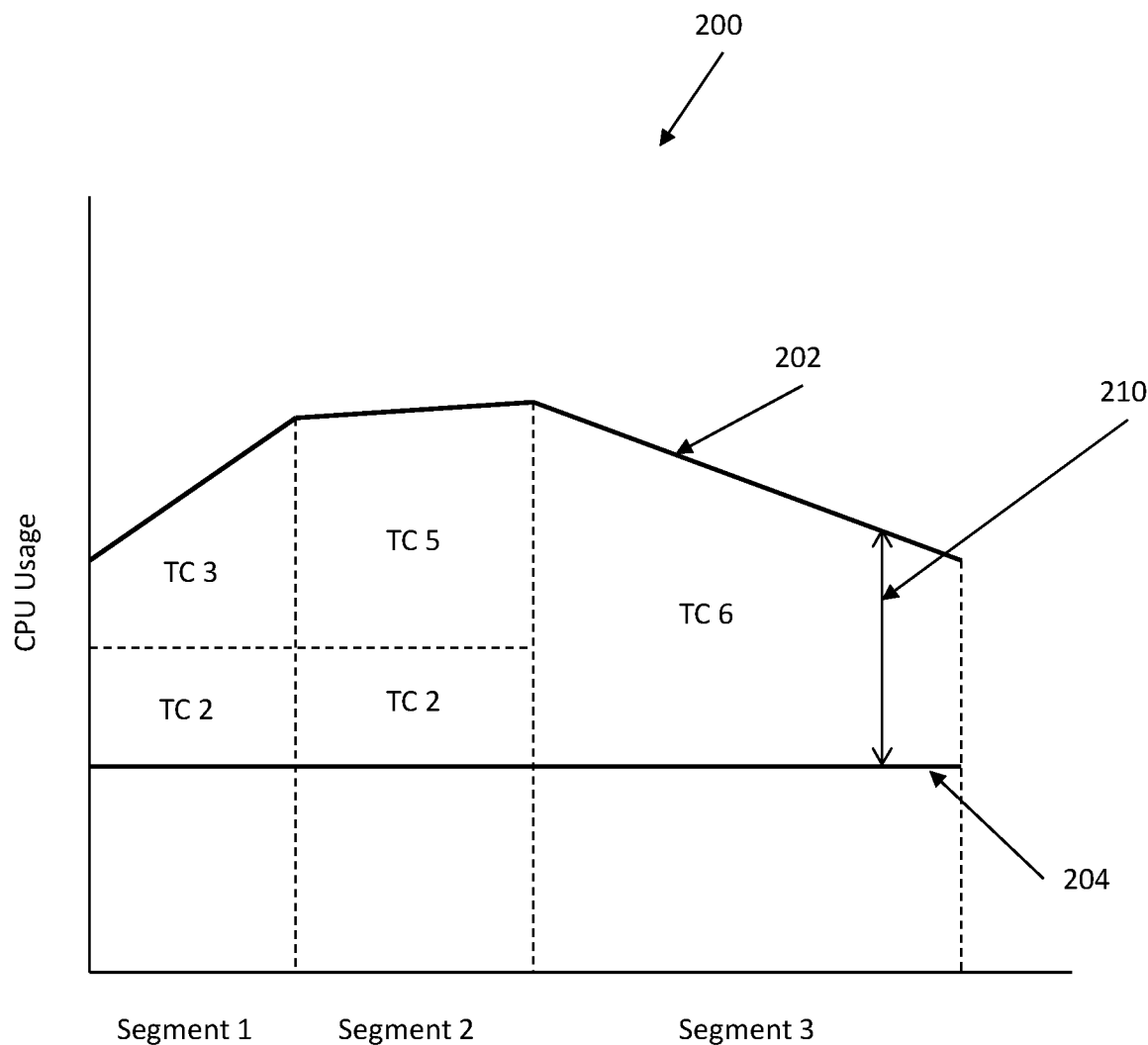
FIG. 2 depicts a graphical representation of a hidden input value as a sequence according to one or more embodiments of the present invention.

In one or more embodiments of the present invention, after identification of the hidden inputs for a process, these values can be stored in the system environment database 106 as a sequence. This sequence data can be both graphed and utilized to create testing models that can used for system diagnostics and/or analytics. The state of the system over the time of process execution can be graphed to display resource usage and hidden inputs. FIG. 2 depicts a graphical representation 200 of a hidden input value as a sequence according to one or more embodiments of the present invention. The graphical representation 200 depicts CPU usage over a time sequence. The time sequence is segmented into three segments, Segment 1, Segment 2, and Segment 3. The segmentation can be done based on process boundaries (e.g., start and end of a process). The CPU usage for the first system 110 is depicted as line 202 which has varying values for CPU usage across the three time segments. The CPU usage for the second system 120 is depicted as line 204 and shows a relatively consistent value for CPU usage over the three time segments. To re-create the CPU usage (e.g., hidden value) of the first system 110 on the second system 120, the controller 102 (from FIG. 1) can determine a delta 210 between the CPU usage values for each segment. Then the controller 102 can determine one or more test cases for each time segment to execute on the second system 120 to mimic the CPU usage values that were present on the first system 110 during execution of a software application. The graph 200 includes several test cases which are utilized in conjunction with each other or individually to drive the CPU usage values to the level monitored on the first system 110. During Segment 1, test case 2 (TC 2) and test case 3 (TC 3) are executed to bring the CPU usage to the levels in the first system 110 during time segment 1 for the second system 120. For Segment 2, test case 2 (TC 2) and test case 5 (TC 5) are utilized to mimic the CPU usage for this particular time segment. And test case 6 (TC 6) is executed during time Segment 3 to mimic the CPU usage for the first system 110 during Segment 3.

In one or more embodiments of the present invention, for each time segment, the integral can be calculated and compared with the stored hidden input data. If there exists a test case that closely matches the curve of the time segment, this test case can be executed on the second system to advance the system state towards the system environment of the first system 110. If no test case exists, multiple test case can be utilized. Doing this for each time segment would result in a series of test cases that can executed in order achieve a system state on the second system 120 similar to the one on the first system 110. This would enable a target process to run in a similar environment on a different system.

In one or more embodiments of the present invention, the monitoring engine 104 can collect system trace data associated with the first system 110. During execution of computer software on a computing system, trace data is generated at various trace points located in the software. Some trace data relates to events that occur during the normal execution of the software, and other trace data is generated in the event an error occurs during execution of the software. When an error occurs during execution of the computer software, the trace data that was generated during execution of the software is examined to determine the source of the error. In order to allow examination of the trace data to determine the source of an error, the trace data is collected and stored on a storage device in the computing system. Trace data may be stored in a trace queue including a fixed size first-in-first-out (FIFO) buffer. At any given time, such a trace queue contains the most recently entered trace data, with the oldest trace data being overwritten as new trace data is generated during the execution of the computer software. In large software systems that run on computer systems comprising numerous internal or external devices, numerous trace points are needed; hence, a large volume of trace data may be generated during execution of such a software system.

FIG. 3 depicts a flow diagram of a method for hidden input detection and re-creation of system environments according to one or more embodiments of the present invention. At least a portion of the method 300 can be executed, for example, by the controller 102 shown in FIG. 1. The method 300 includes receiving system data associated with a software application running on a first system, the system data including system environment data captured during execution of the software application on the first system, as shown in block 302. The system data can include system trace data that captures the system state while the a software program is executing At block 304, the method 300 includes determining one or more hidden inputs of an environment of the first system during execution of the software application based at least in part on the system environment data. And at block 306, the method 300 includes re-creating the environment of the first system during execution of the software application on a second system. Re-creating the system can include segmenting values of the one or more hidden inputs in the first system into time segments and then identifying test cases that can mimic these hidden input values during each time segment. To re-create the system state of the first system, the second system can execute these test cases in order based on the time segments and thus mimic the system state of the first system on the second system to be utilized for further testing.

Additional processes may also be included. It should be understood that the processes depicted in FIG. 3 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
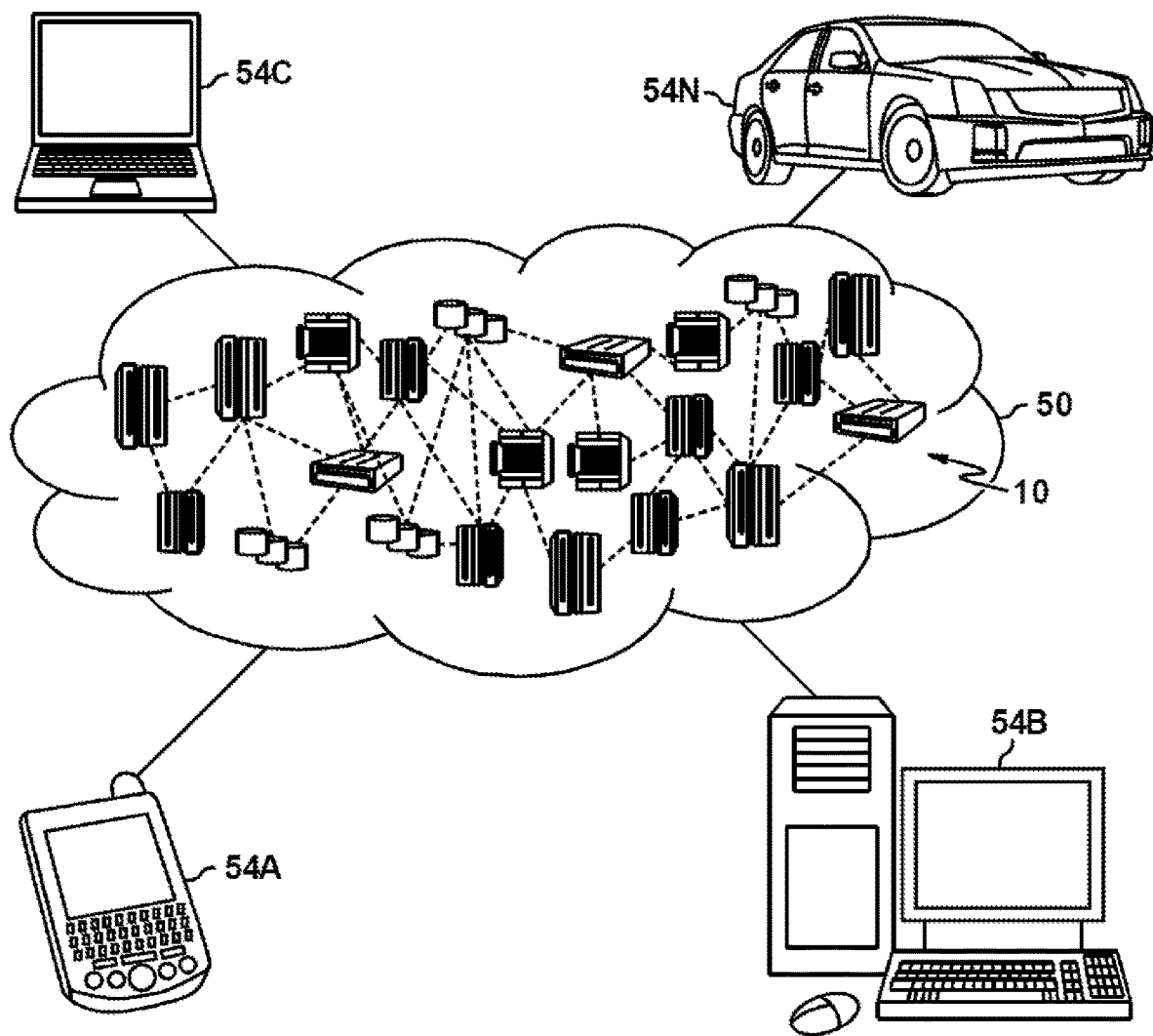
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
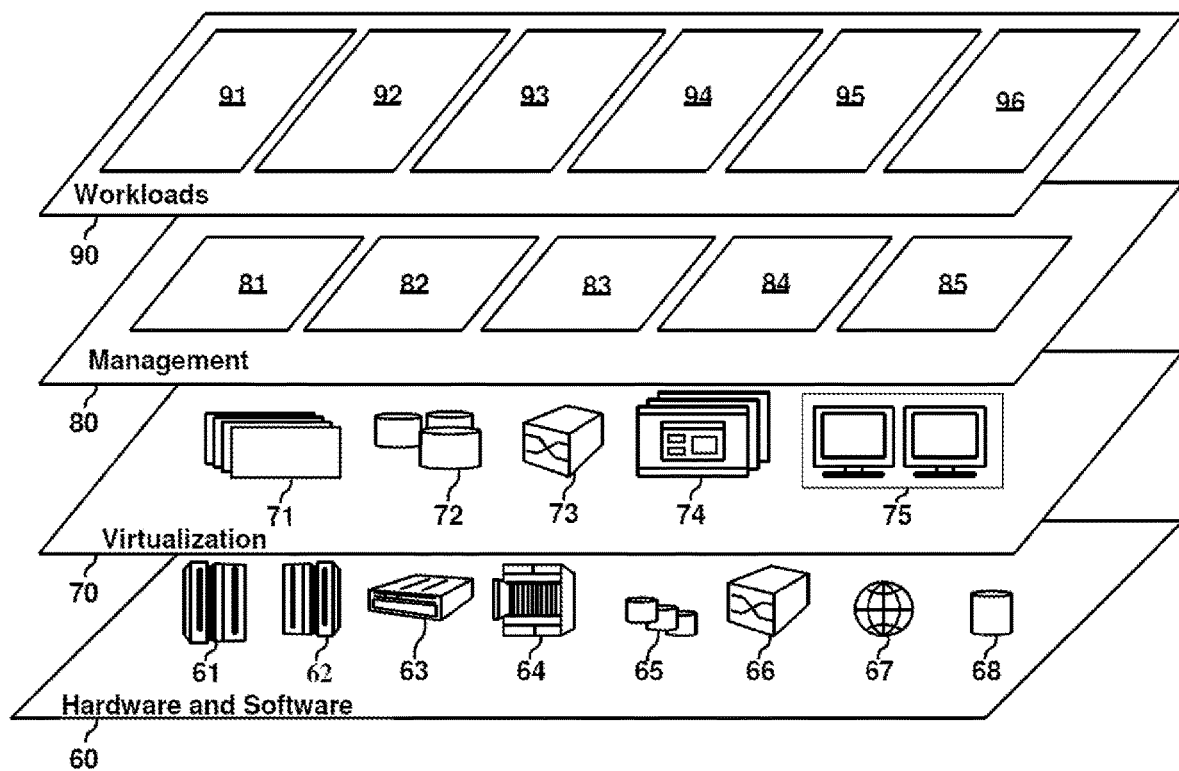
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hidden input anomaly detection and re-creation of a system environment 96.

Figure 6:
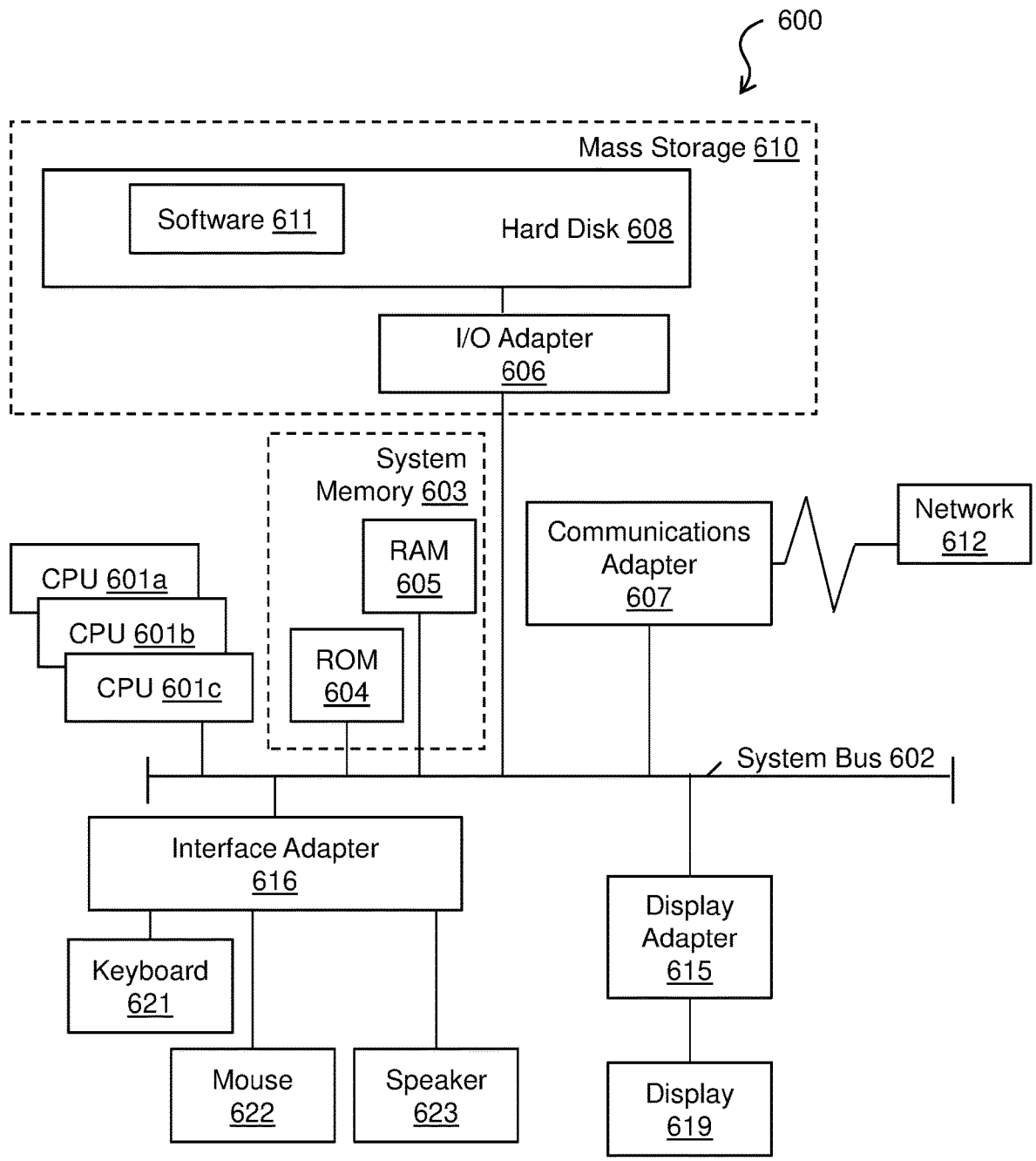
FIG. 6 depicts a block diagram of a computer system for use in implementing one or more embodiments of the present invention.

In one or more embodiments of the present invention, the controller 102 and any of the hardware/software modules in the system 100 from FIG. 1 can be implemented on the processing system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving system data associated with a software application running on a first system, the system data comprising system environment data captured during execution of the software application on the first system;
   determining one or more hidden inputs of an environment of the first system during execution of the software application, the determining based at least in part on the system environment data; and
   re-creating the environment of the first system during execution of the software application on a second system, the re-creating based at least in part on the one or more hidden inputs, wherein re-creating the environment of the first system during execution of the software application on a second system comprises:
   segmenting values of the one or more hidden inputs of the first system into a plurality of time segments;
   determining one or more test cases to execute to mimic the values of the one or more hidden input of the first system for each time segment in the plurality of time segments, wherein determining one or more test cases to execute to mimic the hidden input values of the first system comprises:
   graphically representing the environment of the first system over the plurality of time segments;
   graphically representing a second environment of the second system of the plurality of time segments;
   determining a delta for each time segment in the plurality of time segments, wherein the delta comprises a difference between the environment of the first system and the second environment of the second system; and
   determining the one or more test cases to re-create hidden input values for each time segment based on the delta for each time segment; and
   executing the one or more test cases during each time segment in the plurality of time segments on the second system.

2. The computer-implemented method of claim 1, wherein the segmenting the environment of the first system into a plurality of time segments is based at least in part on a process boundary defined by a start time and end time of a process.

3. The computer-implemented method of claim 1, wherein the system data is received responsive to a determination of a fault on the first system.

4. The computer-implemented method of claim 1, wherein the one or more hidden inputs comprise at least one of memory usage, central processing unit (CPU) consumption, resource contention, input/output (I/O) activity, active address spaces, peripheral component interconnect express (PCI-E) activity, physical hardware activity, and attached device activity.

5. The computer-implemented method of claim 1, wherein the system environment data comprises system trace data.

6. A system comprising:
   a memory having computer readable instructions; and
   one or more processors for executing the computer readable instructions, the computer readable instructions controlling the one or more processors to perform operations comprising:
   receiving system data associated with a software application running on a first system, the system data comprising system environment data captured during execution of the software application on the first system;

determining one or more hidden inputs of an environment of the first system during execution of the software application based at least in part on the system environment data; and re-creating the environment of the first system during execution of the software application on a second system, wherein re-creating the environment of the first system during execution of the software application on a second system comprises:

segmenting values of the one or more hidden inputs of the first system into a plurality of time segments;

determining one or more test cases to execute to mimic the values of the one or more hidden input of the first system for each time segment in the plurality of time segments, wherein determining one or more test cases to execute to mimic the hidden input values of the first system comprises:

graphically representing the environment of the first system over the plurality of time segments;

graphically representing a second environment of the second system of the plurality of time segments;

determining a delta for each time segment in the plurality of time segments, wherein the delta comprises a difference between the environment of the first system and the second environment of the second system; and determining the one or more test cases to re-create hidden input values for each time segment based on the delta for each time segment and executing the one or more test cases during each time segment in the plurality of time segments on the second system.

7. The system of claim 6, wherein the segmenting the environment of the first system into a plurality of time segments is based at least in part on a process boundary defined by a start time and end time of a process.

8. The system of claim 6, wherein the system data is received responsive to determination of a fault on the first system.

9. The system of claim 6, wherein the one or more hidden inputs comprise at least one of memory usage, central processing unit (CPU) consumption, resource contention, input/output (I/O) activity, active address spaces, peripheral component interconnect express (PCI-E) activity, physical hardware activity, and attached device activity.

10. The system of claim 6, wherein the system environment data comprises system trace data.

11. A computer program product comprising a computer readable storage medium having program instructions embodied therewith, the program instructions executable by a processor to cause the processor to perform operations comprising:

receiving system data associated with a software application running on a first system, the system data comprising system environment data captured during execution of the software application on the first system;

determining one or more hidden inputs of an environment of the first system during execution of the software application based at least in part on the system environment data; and re-creating the environment of the first system during execution of the software application on a second system, wherein re-creating the environment of the first system during execution of the software application on a second system comprises:

segmenting values of the one or more hidden inputs of the first system into a plurality of time segments;

determining one or more test cases to execute to mimic the values of the one or more hidden input of the first system for each time segment in the plurality of time segments, wherein determining one or more test cases to execute to mimic the hidden input values of the first system comprises:

graphically representing the environment of the first system over the plurality of time segments;

graphically representing a second environment of the second system of the plurality of time segments;

determining a delta for each time segment in the plurality of time segments, wherein the delta comprises a difference between the environment of the first system and the second environment of the second system; and determining the one or more test cases to re-create hidden input values for each time segment based on the delta for each time segment; and executing the one or more test cases during each time segment in the plurality of time segments on the second system.

12. The computer program product of claim 11, wherein the segmenting the environment of the first system into a plurality of time segments is based at least in part on a process boundary defined by a start time and end time of a process.

13. The computer program product of claim 11, wherein the system data is received responsive to determination of a fault on the first system.

14. The computer program product of claim 11, wherein the one or more hidden inputs comprise at least one of memory usage, central processing unit (CPU) consumption, resource contention, input/output (I/O) activity, active address spaces, peripheral component interconnect express (PCI-E) activity, physical hardware activity, and attached device activity.

\* \* \* \* \*